UNITED STATES PATENT OFFICE.

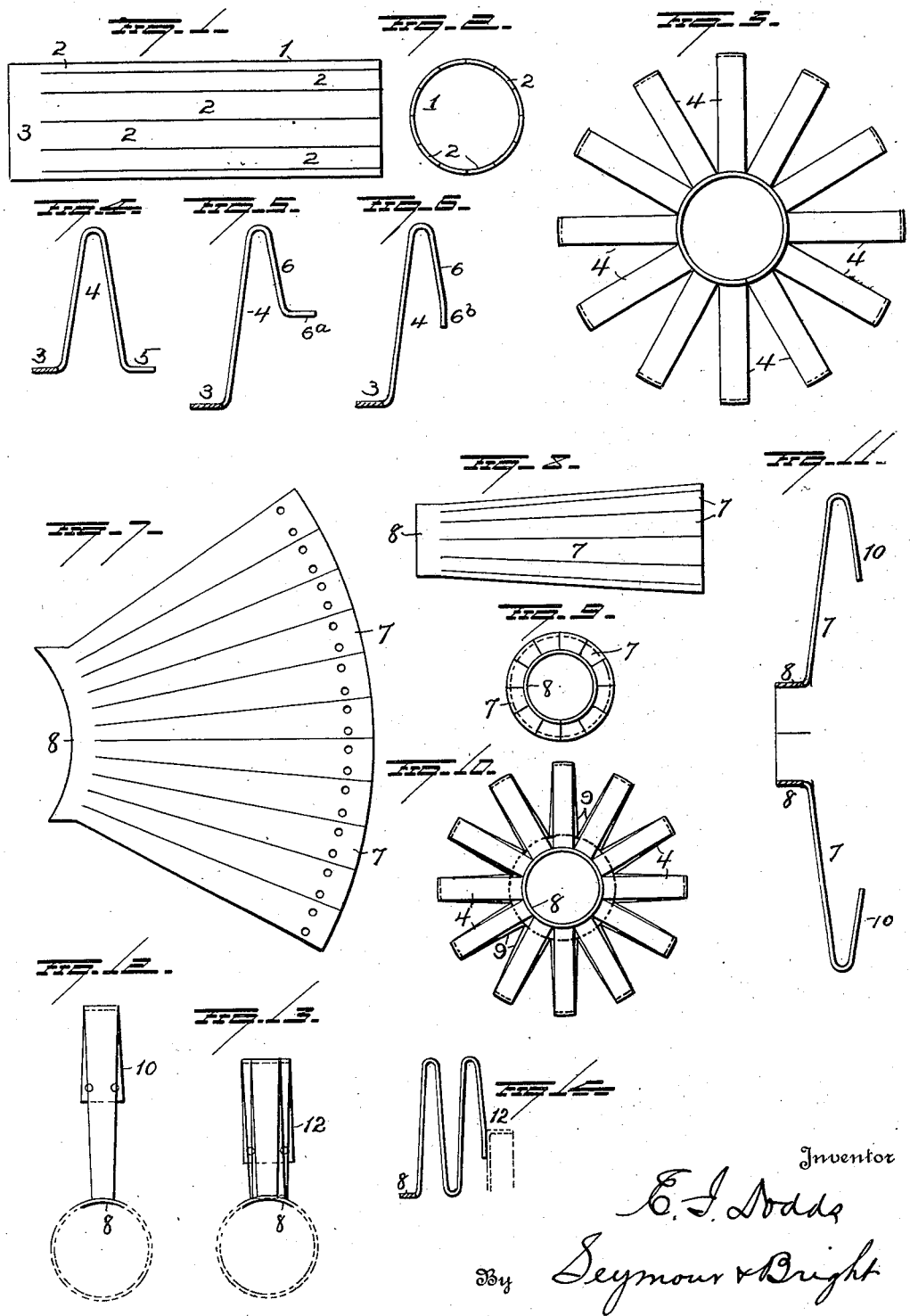

ETHAN I. DODDS, OF CENTRAL VALLEY, NEW YORK, ASSIGNOR TO FLANNERY BOLT COMPANY, OF PITTSBURGH, PENNSYLVANIA.

WHEEL STRUCTURE.

1,426,158.  Specification of Letters Patent.  Patented Aug. 15, 1922.

Application filed December 13, 1920. Serial No. 430,273.

*To all whom it may concern:*

Be it known that I, ETHAN I. DODDS, a citizen of the United States, and a resident of Central Valley, in the county of Orange and State of New York, have invented certain new and useful Improvements in Wheel Structures; and I do hereby declare the following to be a full, clear, and exact description of the invention, such as will enable others skilled in the art to which it appertains to make and use the same.

This invention relates to improvements in wheels and more particularly to a sheet metal body portion for a wheel,—one object of the invention being to so construct a sheet metal wheel body that it may be made from a single blank and provide spokes and hub portions, and so that it may be readily adaptable to receive a brake or sprocket wheel secured to its spoke portions.

With these and other objects in view, the invention consists in certain novel features as hereinafter described and pointed out in the claims.

In the accompanying drawings; Figure 1 is a view of a slit blank bent into cylindrical form; Figure 2 is an end view of the blank shown in Figure 1; Figure 3 is a side elevation of a wheel body made from the blank shown in Figure 1; Figures 4, 5 and 6 are detail views showing different spoke formations; Figure 7 is a view of a tapering slit blank; Figure 8, is a view of a conical blank made from the blank shown in Figure 7; Figure 9 is an end view of the blank shown in Figure 8; Figure 10 is a side elevation of a wheel body made from the blank shown in Figure 8; Figures 11 and 12 are detail views of portions of a wheel body made from the blanks shown in Figures 7 and 8, but in which the spoke portions to which a brake or sprocket wheel may be secured, are shorter than is shown in Figure 10, and Figures 13 and 14 are views illustrating a modification of the spoke formation.

1 represents a blank constructed of sheet metal bent into tubular form and split in a manner to provide a plurality of spoke-forming strips or members 2 projecting from a circular strip 3 to form the hub portion (or a part thereof) of a wheel body. The strips 2 are bent outwardly so as to radiate from the hub strip 3 and then bent backwardly or inwardly and form the spokes 4. The spoke strips may be so bent that the two members of each spoke will be equal in length and the free ends of the bent-back portions of the spokes may be bent to provide lateral flanges 5 in line with the hub strip 3 and forming, with the latter, the hub portion of the wheel body. A wheel body thus constructed is shown in side elevation in Figure 3.

The free member 6 of each spoke may be made shorter than the other member and provided at its free end with a lateral lug or flange 6ª as shown in Figure 5, to be secured to a brake or sprocket wheel, or the free end portion of each short spoke member may be so bent that it will be at right angles to the axis of the wheel body as shown at 6ᵇ, in Figure 6, for the same purpose.

Instead of making the blank for the wheel body, from a rectangular slit sheet, bent to form a cylinder such as shown in Figure 1, the sheet may be made tapering as shown in Figure 7 and the spoke-forming members 7 made to radiate from a curved hub-forming strip 8. This sheet is bent to form a conical blank such as shown in Figure 8, and the spoke forming strips bent as previously explained to provide the free spoke members 9 in Figure 10 to be secured to a brake or driving wheel. When the wheel body is made from the blanks shown in Figures 7 and 8, the free spoke members will be greater in width than the other members of the spokes and will therefore provide broad surfaces to receive a brake or driving wheel. If desired, the free spoke members may be made comparatively short as shown at 10, Figures 11 and 12.

If desired the spoke forming strips of a blank may be bent back and forth so as to provide several spoke members 11 and the free spoke members 12 made shorter than the others, as shown in Figures 13 and 14.

Having fully described my invention what I claim as new and desire to secure by Letters-Patent, is:—

1. A sheet metal wheel body made in a single piece and comprising a hub member and radial spoke strips projecting therefrom and bent to provide free members projecting toward the axis of the hub member.

2. A sheet metal wheel body made in a single piece and comprising a hub member and radial spoke strips projecting therefrom and bent to provide free spoke members projecting toward the axis of the hub member, said free spoke members being shorter than the spoke members which are integral with the hub member.

3. A sheet metal wheel body made in a single piece and comprising a hub member and radial spoke strips projecting therefrom and bent to provide free spoke members projecting toward the axis of the hub member, said free spoke members being shorter than the spoke members which are integral with the hub member, and lateral flanges at the free ends of the short free spoke members.

In testimony whereof, I have signed this specification in the presence of two subscribing witnesses.

ETHAN I. DODDS.

Witnesses:
ETHAN IRA DODDS, Jr.,
HENRY W. CROMWELL.